United States Patent [19]

Bayliss

[11] 4,131,325
[45] Dec. 26, 1978

[54] ELECTRICALLY CONTROLLED FLUID BRAKE SYSTEM

[75] Inventor: John P. Bayliss, Redditch, England

[73] Assignee: Girling Limited, Birmingham, England

[21] Appl. No.: 824,107

[22] Filed: Aug. 12, 1977

Related U.S. Application Data

[63] Continuation of Ser. No. 642,382, Dec. 19, 1975, abandoned.

[30] Foreign Application Priority Data

Jan. 2, 1975 [GB] United Kingdom .................. 157/75

[51] Int. Cl.² .............................................. B60T 8/00
[52] U.S. Cl. ...................................... 303/93; 244/111
[58] Field of Search ................. 244/111; 303/3, 7, 15, 303/20, 93, 100, 106, DIG. 1

[56] References Cited

U.S. PATENT DOCUMENTS

| | | | |
|---|---|---|---|
| 3,402,972 | 9/1968 | Cooper et al. | 303/20 |
| 3,827,760 | 8/1974 | Fleagle | 303/106 |
| 3,909,075 | 9/1975 | Pittet, Jr. et al. | 303/20 X |
| 3,910,646 | 10/1975 | Grix | 303/100 |

Primary Examiner—Stephen G. Kunin

[57] ABSTRACT

A vehicle braking system employs a fluid pressure operated device for engaging the brakes. Flow of liquid under pressure to this device is controlled by a solenoid inlet valve and escape of fluid is controlled by a solenoid outlet valve both of which are normally closed. A demand signal and a feedback signal representing the degree to which brake operation has been achieved are fed to a comparator circuit and the valves are energized in accordance with the sign of the error signal. Operation of the respective means for controlling the operation of the respective valves is obtained by a pulse train generator, and a pair of pulse width modulating means, connected to the respective valves for modifying the mark-space ratio of the pulse train.

3 Claims, 3 Drawing Figures

ELECTRICALLY CONTROLLED FLUID BRAKE SYSTEM

RELATED APPLICATION

The present application is a continuation of Ser. No. 642,382, filed Dec. 19, 1975, now abandoned for which all rights are claimed.

BACKGROUND OF THE INVENTION

This invention relates to a braking system which is particularly, but not exclusively, of utility for rail vehicles. It is an object of the invention to provide a braking system in a convenient form.

SUMMARY OF THE INVENTION

A braking system in accordance with the invention comprises a chamber having means therein movable by fluid pressure in order to apply a wheel brake or brakes, an electrically operable inlet valve and an electrically operable outlet valve for controlling the flow of fluid into and out of the chamber respectively, and an electrical circuit controlling said valves. The circuit includes a first variable input means and a second variable means which is responsive to the degree of brake application achieved, the circuit is arranged to provide an output variable in accordance with said first input means and with said second variable means, and to operate one of said valves when said output is greater than a first predetermined value and the other of said valves when the output is less than a second predetermined value not greater than said first predetermined value so as to vary the degree of brake application to bring said output to substantially said first predetermined value.

The control circuit for said valves includes an error amplifier arrangement for deriving an electrical signal of magnitude and polarity related to the difference between the signals produced by said variable input means and said second variable means, and means for controlling the respective values, comprising means for generating a continuous pulse train of selected frequency and a pair of pulse width modulating circuits effective in response to the error signal to vary the mark-space ratio of the pulses therein and provide a signal to one or the other of inlet or outlet valves.

The system may also include an anti-skid protection system which is intended to release the brake on any wheel or group of wheels whenever the deceleration of that wheel or of any wheel of that group of wheels exceeds a predetermined level. In this case, the protection system would be connected to provide an output to energize the outlet valve associated with the wheel or group of wheels when said deceleration exceeds the predetermined level. In addition, the protection system may also provide an overriding signal to the error amplifier to replace the feedback signal which will disappear when the protection system causes brake release.

DESCRIPTION OF THE INVENTION

Figure 1:
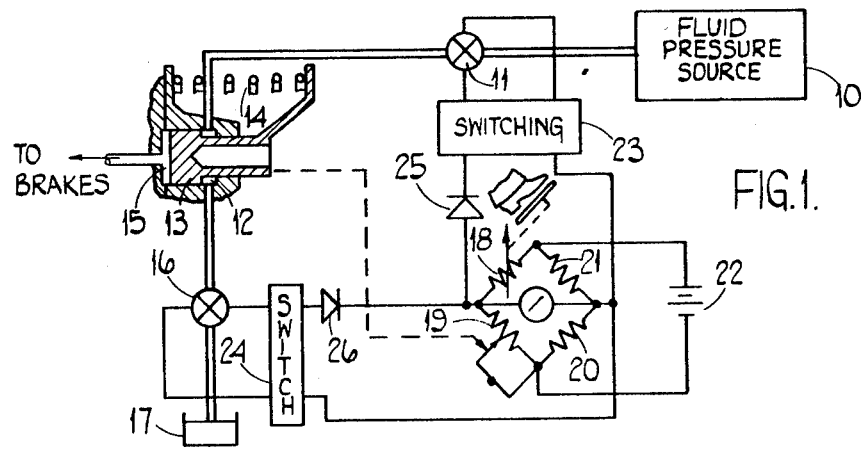
FIG. 1 is a block diagram of a vehicle braking system.

In the example shown in FIG. 1, there is provided a fluid pressure source which may be in the form of a combination of an electric motor, an accumulator and a pressure switch operable to de-energize the motor when a desired pressure is attained. This fluid pressure source 10 is connected via a first solenoid valve 11 to a chamber 12 in which there is slidably mounted a piston 13. The piston 13 is spring loaded by a spring 14 so that when the valve 11 is opened the pressure applied to the piston 13 moves it against its spring loading. The piston 13 also defines a brake master cylinder 15, such that when the piston 13 is displaced against its spring loading as aforesaid fluid is displaced from the cylinder 15 to actuate a brake or a plurality of brake devices. A further solenoid valve 16 connects the chamber 12 to a drain 17.

An electrical circuit is provided for controlling the two valves 11 and 16. This circuit includes a bridge formed of four resistive arms 18, 19, 20 and 21, the resistors 18 and 19 both being variable. The junction between the resistors 18 and the resistor 21 is connected to one side of a power supply in the form of a battery 22 and the junction between the resistor 19 and the resistor 20 is connected to the other side of the power supply. The output of the bridge is the voltage between the junction between the resistors 18 and 19 and the junction between the resistors 20 and 21.

The variable resistor 18 forms a variable input means and is mechanically connected to a brake operating level whereby its resistance can be varied. The variable resistor 19 forms a second variable means and is mechanically connected to the piston 13 to provide feedback into the electrical circuit.

The output of the bridge is applied via two switching circuits 23, 24 to the windings of the valves 11 and 16. Each switching circuit consists of an electric circuit with or without a relay and is arranged to energize the associated winding whenever current starts to flow from the bridge through the input stage of the switching circuit. The two switching circuits are arranged to respond to opposite polarities of the output from the bridge and two diodes 25, 26 are included to permit current flow into the switching circuit 23 only when the junction between the resistors 18, 19 is at a higher potential than the junction between the resistors 20, 21 and to permit current flow into the switching circuit 24 only when the former junction is at a lower potential than the latter.

In use, therefore, the user of the brake system, for example a railway engine driver, can select the braking effort to be applied by adjusting the resistor 18 by means of the brake lever. When the position of the piston 13 is such that the ratio of the resistances 18 and 19 is the same as the ratio of the resistances 21 and 20, the bridge will be in balance and there will be no input into either of the switching circuits 23, 24 and both valves 11, 16 will be closed, thereby hudraulically locking the piston 13. When the bridge is out of balance in one sense resulting from the piston 13 being further to the right (as viewed in the drawing) than the piston demanded, the bridge will produce a positive output and switching circuit 23 will energize the winding of the valve 11 which will open to admit pressurized fluid to the chamber 12. This causes movement of the piston to the left which, in turn, causes adjustment of the variable resistor 19 to reduce the output of the bridge towards the null position. Similarly, if the piston is too far to the left, the bridge will produce a negative output, thereby opening valve 16 and causing the piston to be displaced to the right by the spring 14. Thus the variable resistor is again adjusted to reduce the output of the bridge towards the null position.

The piston will thus be caused to take up a different equilibrium position for each different position of the variable resistor 18. Since the resistor 18 is continuously variable, continuous variation of the degree of brake application is possible.

Although the example described above utilizes the position of the piston 13 to provide mechanical feedback of information relating to the degree of application of the brakes to the electrical circuit, other forms of feedback are possible. Thus, for example, the resistor 19 may be variable by means of a pressure sensing device connected to the master cylinder 15.

Furthermore, in the above described example, the two switching circuits are arranged to operate at the same voltage level, but it will be appreciated that the circuit 23 could be arranged to operate at a first predetermined level and the circuit 24 at a lower level, to provide a dead band in which neither valve is actuated. This would tend to stabilize the system and prevent oscillatory brake operation.

Figure 2:
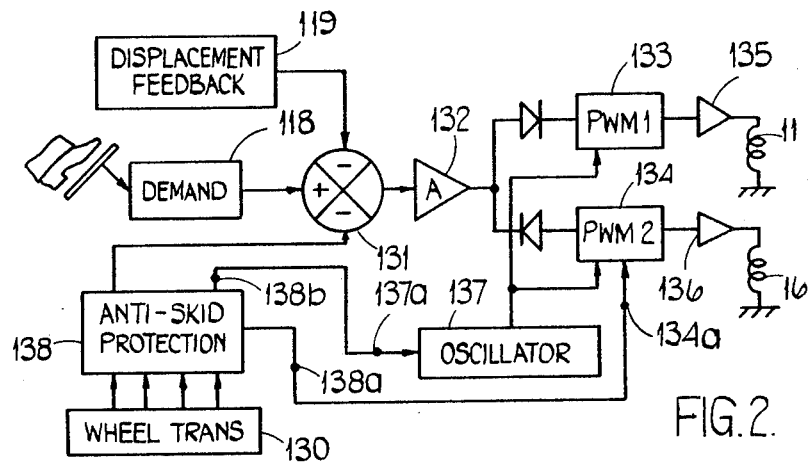
FIG. 2 is a block diagram showing an example of the braking system of the present invention.

Turning now to FIG. 2, a braking system is illustrated which includes the antiskid protection circuit. As is well known, such a circuit includes a wheel speed transducer or transducers 130 which may provide a.c. output signals with their frequency directly proportional to the wheel speed. The circuit quite conventionally includes a frequency to d.c. voltage converter, a differentiating circuit which produces a deceleration signal which increases in magnitude as the wheel deceleration increases and a threshold comparator which produces a brake inhibit output signal when the deceleration signal exceeds a predetermined level. In a conventional braking system including a mechanically operated master cylinder for producing the brake operating fluid pressure, the protection circuit operates a valve to release the brake pressure in the fluid circuit associated with the brakes of the wheel or wheels controlled by the protection circuit. In the present case, however, the output of the protection circuit is used to override the control of the outlet valve 16.

In the system shown in FIG. 2, there is a brake demand signal generator 118 which corresponds to the potentiometer 18 of FIG. 1, and a displacement feedback signal generator 119 corresponding to the potentiometer 19. The demand and feedback signals are supplied to a summing circuit 131 with opposite signs so as to produce an error signal which is amplified by an amplifier 132. Two voltage-controlled pulse width modulators 133, 134, fed with a continuous series or train of pulses generated by an oscillator 137, are controlled by the polarity and magnitude of the amplifier 132 and in turn control the average voltage applied via driver circuits 135, 136 respectively to the solenoid valves 11 and 16. The modulator 133 produces no output pulses when the error signal is negative and produces a pulse train with a progressively increasing mark-space ratio as the error signal becomes progressively more positive. The modulator 134, on the other hand, produces no pulses when the error signal is positive and a similar pulse train when the error signal is negative. The frequency of the pulses produced by the modulators is determined by the oscillator 137, which generates a continuous pulse train at selected frequency.

The anti-skid protection circuit 138 has an output terminal 138a at which a variable length pulse appears when excessive deceleration is detected. The output terminal 138a is connected to an override terminal 134a on the modulator 134 so that when the output pulse appears the modulator 134 produces drive signals which cause rapid brake pressure reduction.

The circuit 138 also has an output terminal 138b at which a control signal for controlling the frequency of the oscillator 137 is usually present. When an output pulse appears at the terminal 138a, this frequency control signal disappears and then reappears at a controlled ramp rate thereby varying the rate at which the brakes can be re-applied following overriding by the anti-skid circuit 138.

A further terminal 138c provides an output signal, during overriding operation of the anti-skid system, which is applied to the summing circuit 131 in the same sense as the signal from the generator 119. This signal prevents the error amplifier arrangement from producing a positive going signal which would open the inlet valve 11.

In the event of a serious skid, the output of the modulator 134 may become continuous to cause rapid brake release, but in a less serious skid only a short pulse may appear at terminal 138a. In either case, removal of the feedback override is slow to control pressure build up. Likewise, the oscillator frequency is reduced in the longer term to limit the following pressure rise rate as the braking pressure is increased up towards the demanded level.

As mentioned in connection with FIG. 1, a brake pressure transducer could be employed instead of the displacement signal generator 119 to provide brake operation feedback.

Figure 3:
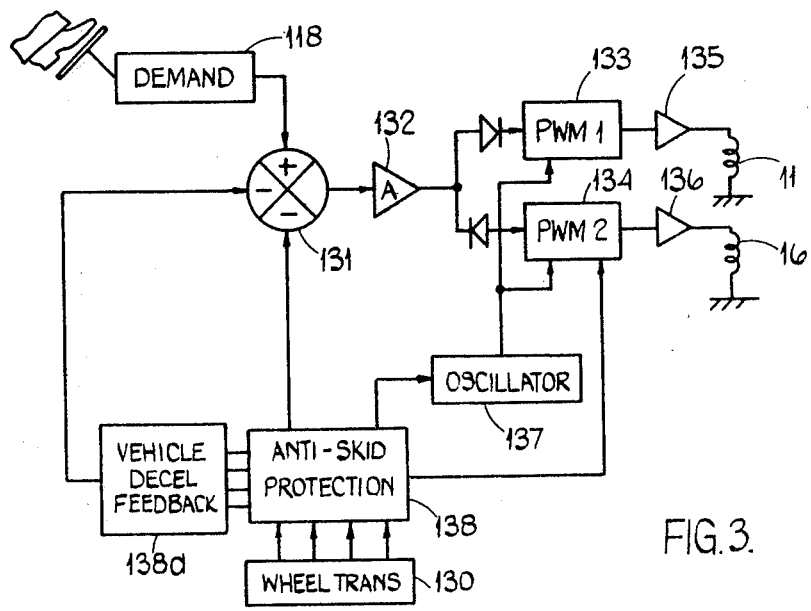
FIG. 3 is a diagram showing another example of the invention.

As yet a further alternative as shown in FIG. 3, the anti-skid system can produce a signal which corresponds to wheel or vehicle deceleration and this signal can be processed by a feedback circuit 138d to produce the required feedback signal varying with the degree of brake application received. Clearly, this signal will not be a valid indication of the effectiveness of the braking when skid conditions exist, but in such conditions the overriding controls described in connection with FIG. 2 effectively break the feedback loop.

What is claimed is:

1. A vehicle braking system comprising a chamber having means therein movable by fluid pressure to apply at least one wheel brake; an electrically operable inlet valve and an electrically operable outlet valve for controlling the flow of fluid into and out of said chamber respectively; and an electrical circuit for controlling said valves, said circuit having a first variable signal input means responsive to driver operation of said braking system, a second variable signal input means responsive to the degree of brake application achieved by the fluid pressure, error signal generating means connected to said first variable input means and to said second variable input means for producing an error signal of polarity and magnitude corresponding to the difference between the signals received from said first variable input means and said second variable input means, and means for generating a pulse train of selected frequency including a pair of pulse width modulation devices each having an input from said error signal generating means, one of said pulse width modulating means having an output connected to said outlet valve, the other of said pulse width modulation means having an output connected to the inlet valve, and means responsive to the polarity of the error signal for determining which one of the pulse width modulation means is operated, said pulse width modulation means acting on said pulse train to produce a mark-space ratio determined by the magnitude of the error signal, whereby the degree of brake application may be varied to bring the error signal to substantially zero and excessive wheel deceleration detection means is connected to the pulse width modulation means associated with said outlet valve and is adapted to apply a continuous signal to said outlet valve to open the same when wheel deceleration greater than said predetermined valve is detected and is also connected to said error signal generating means to override the signal thereto from said variable input means.

2. A braking system as claimed in claim 1, including a common oscillator connected to said pulse width modulation means and adapted to determine the frequency at which said pulse width modulation means operate, said wheel deceleration detection means being further connected to said oscillator to inhibit oscillation of said oscillator when excessive wheel deceleration is detected.

3. A braking system as claimed in claim 2, in which said oscillator is a variable frequency oscillator, and said pulse width modulation means includes a control signal terminal connected to the oscillator, whereby a control signal at said terminal reappears at a controlled ramp rate following removal of said control signal on detection of excessive wheel deceleration.

* * * * *